(12) United States Patent
Sirihongsuwan

(10) Patent No.: US 7,885,504 B2
(45) Date of Patent: Feb. 8, 2011

(54) DUAL-OPTICAL FIBER COUPLER ENCLOSURE

(75) Inventor: Alex Sirihongsuwan, Concord (CA)

(73) Assignee: FCI Americas Technology, Inc., Reno, NV (US)

( * ) Notice: Subject to any disclaimer, the term of this patent is extended or adjusted under 35 U.S.C. 154(b) by 370 days.

(21) Appl. No.: 11/608,447

(22) Filed: Dec. 8, 2006

(65) Prior Publication Data

US 2007/0140641 A1 Jun. 21, 2007

Related U.S. Application Data

(60) Provisional application No. 60/751,007, filed on Dec. 16, 2005.

(51) Int. Cl.
*G02B 6/00* (2006.01)
(52) U.S. Cl. ..................................................... 385/135
(58) Field of Classification Search .................. 385/135
See application file for complete search history.

(56) References Cited

U.S. PATENT DOCUMENTS

| | | | | |
|---|---|---|---|---|
| 4,687,289 A * | 8/1987 | DeSanti | ........................ | 385/135 |
| 4,840,449 A * | 6/1989 | Ghandeharizadeh | ......... | 385/135 |
| 4,861,134 A * | 8/1989 | Alameel et al. | .............. | 385/135 |
| 5,046,811 A * | 9/1991 | Jung et al. | ..................... | 385/15 |
| 5,189,725 A * | 2/1993 | Bensel et al. | ................ | 385/135 |
| 5,247,603 A * | 9/1993 | Vidacovich et al. | .......... | 385/135 |
| 5,303,320 A * | 4/1994 | Duffie | ........................ | 385/135 |
| 5,416,881 A * | 5/1995 | Ikeda | .......................... | 385/135 |
| 5,420,956 A * | 5/1995 | Grugel et al. | ................ | 385/135 |
| 5,519,804 A * | 5/1996 | Burek et al. | ................. | 385/135 |
| 5,530,785 A * | 6/1996 | Sakamoto et al. | ............ | 385/136 |
| 5,604,830 A * | 2/1997 | Kuder et al. | ................... | 385/59 |
| 6,173,106 B1 * | 1/2001 | DeBoynton et al. | .......... | 385/140 |
| 6,327,405 B1 * | 12/2001 | Leyva et al. | ................... | 385/37 |
| 6,621,975 B2 * | 9/2003 | Laporte et al. | ............... | 385/135 |
| 6,647,198 B2 * | 11/2003 | Holmes | ....................... | 385/134 |
| 6,744,962 B2 * | 6/2004 | Allerellie | ..................... | 385/135 |
| 6,807,997 B2 * | 10/2004 | Ahouanto et al. | ............ | 152/540 |
| 2002/0150371 A1 * | 10/2002 | Battey et al. | ................. | 385/135 |
| 2004/0252960 A1 * | 12/2004 | Battey et al. | ................. | 385/135 |
| 2005/0175307 A1 * | 8/2005 | Battey et al. | ................. | 385/135 |
| 2005/0201709 A1 | 9/2005 | DeVincentis et al. | ......... | 385/135 |
| 2005/0276562 A1 * | 12/2005 | Battey et al. | ................. | 385/135 |

* cited by examiner

*Primary Examiner*—Charlie Peng
(74) *Attorney, Agent, or Firm*—Harrington & Smith

(57) ABSTRACT

Disclosed herein is an optical fiber coupler enclosure. The optical fiber coupler enclosure includes a lid member, a base member, and a first end cap. The lid member includes two lid side walls and a first open end. The base member is opposite the lid member. The base member includes two base side walls and a first open end. The base member includes at least one mounting channel proximate to each of the base side walls. The mounting channels are configured to fixedly dispose at least two fiber optic couplers adjacent to one another. The first end cap is disposed between the lid member first open end and the base member first open end.

23 Claims, 6 Drawing Sheets

DUAL-OPTICAL FIBER COUPLER ENCLOSURE

CROSS REFERENCE TO RELATED APPLICATION

This application claims priority under 35 U.S.C. §119(e) to U.S. provisional patent application No. 60/751,007 filed Dec. 16, 2005 which is hereby incorporated by reference in its entirety.

BACKGROUND OF THE INVENTION

1. Field of the Invention

The present invention relates to an enclosure for passive fiber optic components and, more particularly, to a dual-optical fiber coupler enclosure.

2. Brief Description of Prior Developments

Passive fiber optic products, such as couplers for example, are generally designed for use in optical networking systems and test equipment. Couplers enable users to split optical signals into multiple paths or combine multiple signals on one path. Additionally, couplers may also provide for the transmission of data through the optical fiber via multiple modes simultaneously. Couplers are used across a wide range of applications ranging from data communications for military and commercial aircraft to ignition control on power generators. There is a continuing desire among many of these applications for ever smaller data communications devices. This desire has caused manufacturers to seek new ways in which to further miniaturize the data communications devices being produced. Additionally there is an industry wide need for more rugged, robust and reliable data communications devices.

Accordingly, there is a need to provide a compact structure for enclosing fiber optic couplers with high reliability fiber coating, wherein the couplers are mounted opposed and parallel, and wherein the fibers are routed and bended while maintaining small bending radii.

SUMMARY OF THE INVENTION

In accordance with one aspect of the present invention, an optical fiber coupler enclosure is disclosed. The optical fiber coupler enclosure includes a lid member, a base member, and a first end cap. The lid member includes two lid side walls and a first open end. The base member is opposite the lid member. The base member includes two base side walls and a first open end. The base member includes at least one mounting channel proximate to each of the base side walls. The mounting channels are configured to fixedly dispose at least two fiber optic couplers adjacent to one another. The first end cap is disposed between the lid member first open end and the base member first open end.

In accordance with another aspect of the present invention, an optical fiber coupler enclosure is disclosed. The optical fiber coupler enclosure includes a base member and a lid member. The base member includes a first side and two base side walls. The base member includes at least one first peg proximate each of the base side walls. The first pegs extend from the first side. The lid member is connected to the base member. The lid member includes a second side and two lid side walls. The lid member includes at least one second peg proximate each of the lid side walls. The second pegs extend from the second side. The second pegs are aligned with the first pegs. The second pegs and the first pegs are configured to maintain an optical fiber bend radius.

In accordance with yet another aspect of the present invention, an optical fiber coupler enclosure is disclosed. The optical fiber coupler enclosure includes a base member, a lid member, and at least one end cap. The base member includes two base side walls and a first open end. The base member first open end includes a first groove portion. The lid member is opposite the base member. The lid member includes two lid side walls and a first open end. The lid member first open end comprises a first groove portion. The base member and the lid member are configured to hold a first optical fiber coupler therebetween. The end cap is disposed between the base member and the lid member. The end cap includes a first rim portion. The first rim portion is disposed within the base member first groove portion and the lid member first groove portion.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENT

Figure 1:
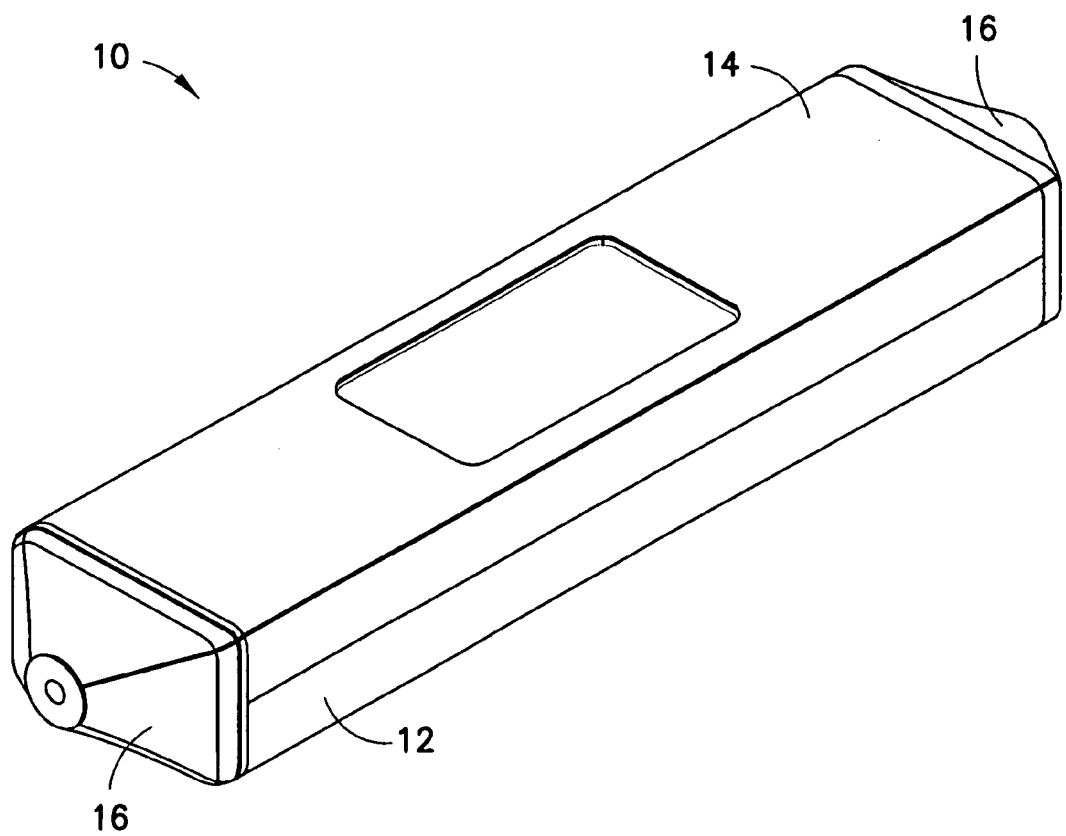
FIG. 1 is a perspective view of an optical fiber coupler enclosure.

Referring to FIG. 1, there is shown a perspective view of a dual-optical fiber coupler enclosure 10 incorporating features of the present invention. Although the present invention will be described with reference to the exemplary embodiment shown in the drawings, it should be understood that the present invention can be embodied in many alternate forms of embodiments. In addition, any suitable size, shape or type of elements or materials could be used.

Figure 2:
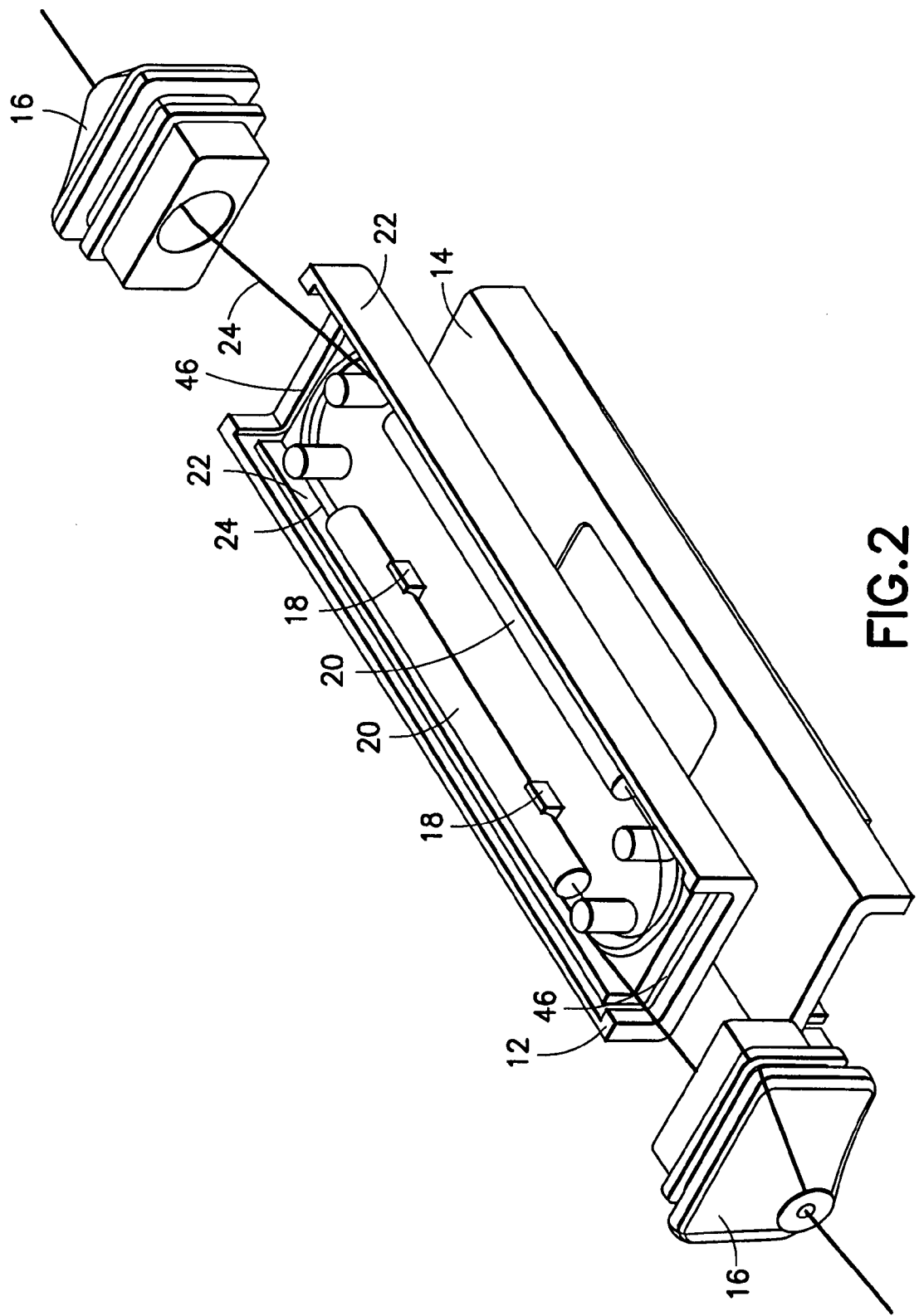
FIG. 2 is an exploded perspective view of the optical fiber coupler enclosure shown in FIG. 1 with optical fiber couplers installed therein.

The dual-optical fiber coupler enclosure 10 is provided comprising a base 12, a lid 14, and two identical end caps 16. In one example of a preferred embodiment, the overall dimension of the assembled components of the enclosure 10 is about 22.0 millimeters wide, 14.0 millimeters high, and 105.0 millimeters long. The enclosure base 12 embodies two pairs of mounting channels 18 which function to mount two optical fiber couplers 20 (shown in FIG. 2); locating the two optical fiber couplers 20 transversally near vertical walls (or base side walls) 22 and parallel to each other. One type of optical fiber 24 which can be used to fabricate the optical fiber coupler 20 requires exceptional coating performance under harsh environment in low bending radius, such as a polyimide coating. The two end caps 16 function as mounts for the fiber cables or polymer tubings, as well as a strain relief. The end cap mounting mechanism can comprise interlocking the end caps 16 to both ends of the base 12 and the lid 14. The base 12, lid 14, and end caps 16 may be fabricated from any suitable material such as composite polymer resin for example.

The design provides a compact structure for enclosing two fiber optic couplers 20 with high reliability fiber coating, in which two couplers 20 are mounted opposed and parallel, whereas the optical fibers 24 can be routed and bent in small bending radius. Each optical fiber coupler 20 functions independently to serve different purpose of data transmission. Certain optical fiber channels on each input and output of each coupler 20 are required to be looped back internally to serve the purpose and requirement of the application. The looping optical fiber is eventually routed through and exits to its reversal direction.

The present design can replace a conventional data communication device which comprises of two optical fiber couplers 20 installed in physical series relative to each other. The overall dimension of the conventional series configuration is about 20.0 millimeters wide, 17.0 millimeters high and 245.0 millimeters long. The present design decreases the physical size in height and length compared to the conventional enclosure noted above. The invention can comprise a greater ruggedness, robustness, and mechanical strength. The fabrication process is also made easier.

Figure 3:
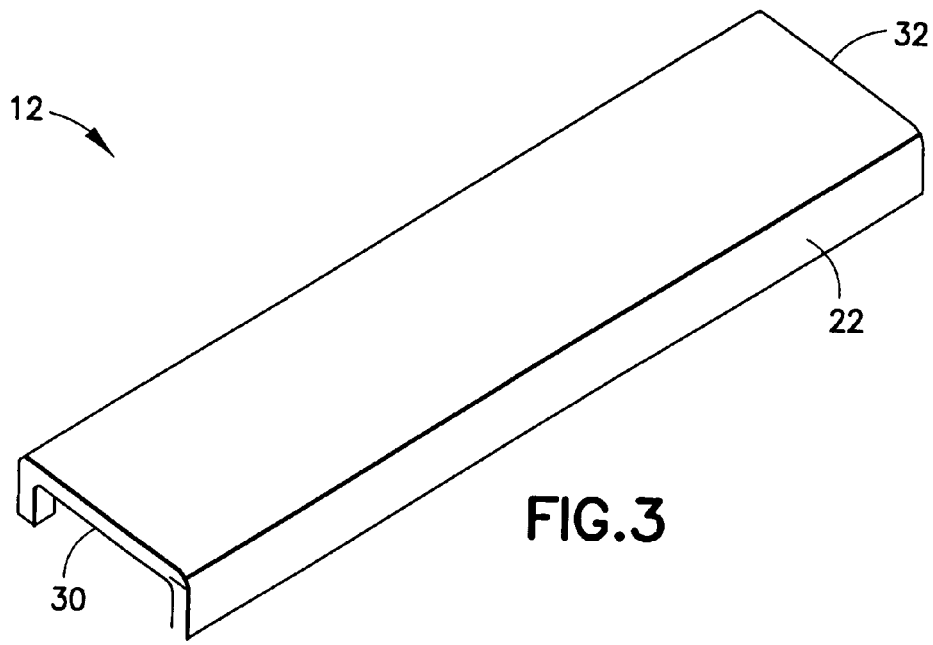
FIG. 3 is a bottom perspective view of a base of the optical fiber coupler enclosure shown in FIG. 1.
Figure 4:
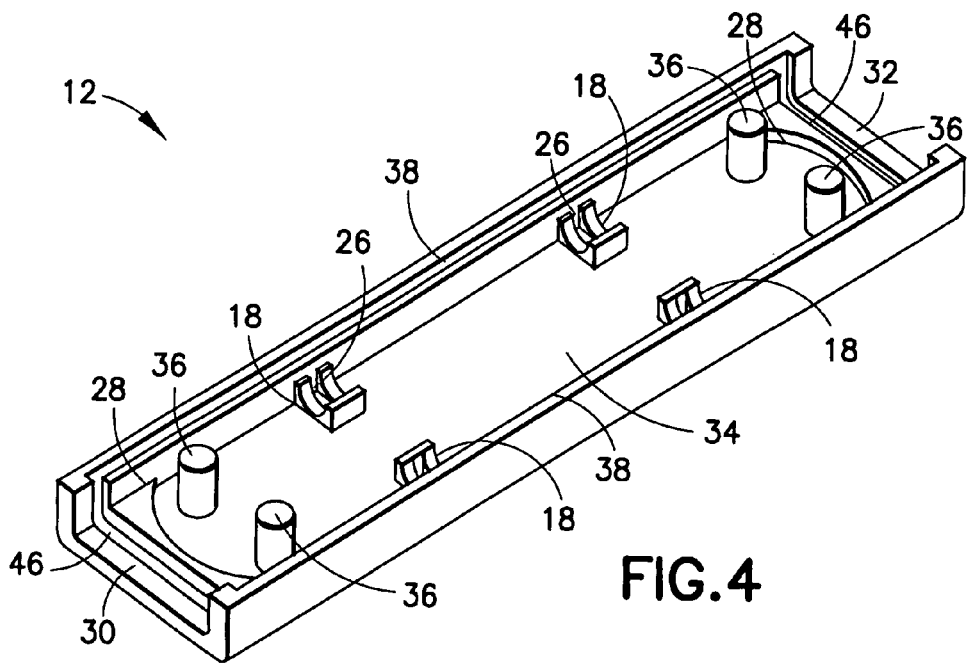
FIG. 4 is a top perspective view of the base of the optical fiber coupler enclosure shown in FIG. 1.

Referring now to FIGS. 3 and 4, the enclosure base (or base member) 12 has fiber optic coupler mounting channels 18 which each have a semi-circular shape to receive the cylindrical shape of one of the two optical fiber couplers 20. In one type of preferred example, the enclosure 10 has flexibility to accept physical dimensions of optical fiber coupler 20 that are ranging from about 2.00-3.30 millimeters in diameter and about 35.00-52.00 millimeters in length. The physical dimension of the optical fiber coupler 20 is directly proportional to the optical configuration. The enclosure 10 of the invention can be designed to be able to accommodate couplers having anywhere from a 1×1 configuration up to a 6×6 configuration, which translates to a maximum of six fiber optic channels on each side of the input and output. It should be noted that although the figures illustrate the mounting channels 18 as having a semi-circular shape to receive cylindrical couplers, any complementary shape to receive an alternatively shaped coupler may be provided.

Each mounting channel 18 has a generally rectangular cavity 26 at the center of its block. This cavity is for receiving RTV silicone which is used for mounting the coupler 20 to the base 12. Besides being used for a coupler mounting purpose, the RTV silicone can act as a shock and vibration absorbing barrier between the coupler 20 and the base 12.

In the embodiment shown, there is a one-millimeter curved and elevated wall 28 near each open end 30 and 32 of the platform (or side) 34 of the base 12. It should be noted that alternative embodiments may comprise elevated walls having a height greater than or less than 1.00 millimeters. The purpose of this wall 28 is to provide smooth fiber routing and limit the minimum fiber-bending radius. The fiber 24 coating type can be crucial to this type of enclosure 10. The high reliability coating for an optical fiber 24, such as polyimide material or Pyrocoat™ (a trademark of Furukawa Electric North America, Inc.), has exceptional performance in mechanical and environmental properties. To meet the minimum fiber 24 bending radius requirement of this enclosure 10 design, the fiber bending radius specification is preferably at least about 10.0 millimeters.

In addition, there are four pegs 36; two at, or proximate to, each end 30, 32. The pegs 36 may have any suitable diameter, such as 3.00 millimeters, for example. The pegs 36 extend from the side 34 of the base 12. The pegs 36 function as strength support in the vertical direction. These pegs 36 are not only provided for mechanical strength. The pegs 36 also provide a smooth transition of fiber bending while the fiber 24 is entering the curvature wall 28; in order to maximizing the bending radius of the fiber 24. In fiber optic characteristic, fiber bending causes the optics or light able to escape from the fiber 24. This phenomenon is called optical loss. Additionally, the disclosed enclosure 10 preferably supports fiber cladding up to 140 micrometers in diameter. Fiber cladding diameters greater than 140 micrometers may experience excessive loss or attenuation. It should be noted that the fibers 24 extending from the couplers 20 may loop around the pegs 36 any number of times depending on the specific application. The base 12 further comprises an extending groove portion 38 extending along the base side walls 22. The groove portion 38 serves as a lateral engagement feature for the lid 14 and provides for increased stability and durability.

Figure 5:
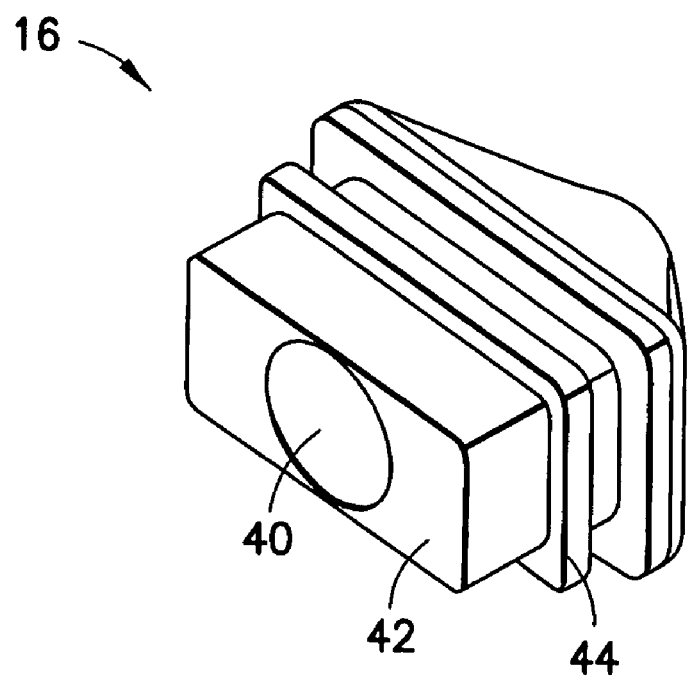
FIG. 5 is a perspective view of one of the end caps of the optical fiber coupler enclosure shown in FIG. 1.
Figure 6:
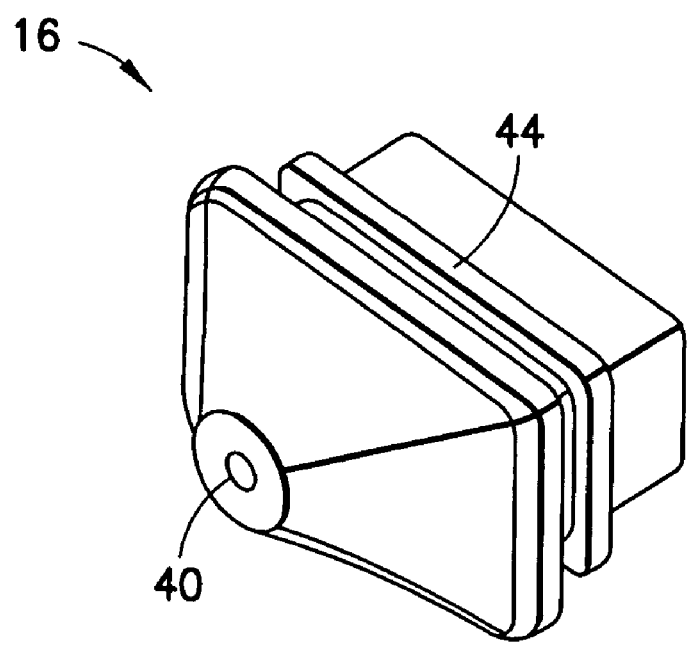
FIG. 6 is a perspective view from an opposite direction of one of the end caps of the optical fiber coupler enclosure shown in FIG. 1.

The end caps 16, best illustrated in FIGS. 5 and 6, generally provide three functions: fiber cable mounting, strain relief and interlocking. In regard to fiber cable mounting, in one exemplary embodiment, the end cap 16 is designed for a small, such as about 1.00 millimeter outer diameter, Teflon or Tefzel tubing for each individual fiber 24 for the purpose of fiber ruggedization. All strands of tubing will be eventually bundled with a circular formation and installed to the end cap 16, such as with a 2.50 millimeters outer diameter. Furthermore, a single cable, such as a 2.50 millimeter outer diameter jacket cable for example, may be used, since the inner buffer diameter is large enough to accommodate up to about twelve 170 micrometer buffer diameter fibers. The fibers 24 are looped around between the pegs 36 and the elevated walls 28 in a general racetrack configuration. The fibers 24 are then bundled and routed out through the end caps 16. One of the end caps 16 may serve as a mount/support for a fiber cable input and the other end cap 16 may serve as a mount/support for a fiber cable output.

For strain relief, the fiber cable bundling in one exemplary embodiment is installed within an opening or hole 40 of the end cap 16 by using high performance epoxy resin to bond the two components together. The conical shape of the hole 40 may form the resin in a taper shape, with its thickest portion located internally at the interior facing side 42. Due to this resin formation, plus the bonding strength between the cable bundling and the end cap 16, it will optimize the strength of cable bundling while it is under strain.

For interlocking, beyond the strain relief capability, the end cap 16 has a square wedge or rim 44 around its internal perimeter. In one exemplary embodiment, the square rim 44 is about 1.50 millimeters thick and about 1.08 millimeters high. This rim feature 44 provides an interlocking mechanism to all the components 10, 12, 14, as well as strain relief support toward fiber cable bundling. The base 12 and lid 14 have square grooves 46, 48 (see FIG. 9), respectively, which receive the rim 44 and are preferably held together with a high performance epoxy resin. The square grooves 46 are located proximate the first open end 30 and the second open end 32 of the base 12. The square grooves 48 are located proximate the first open end 50 and the second open end 52 of the lid 14. It should be noted that square grooves are not required and any suitable shape may be provided.

Figure 7:
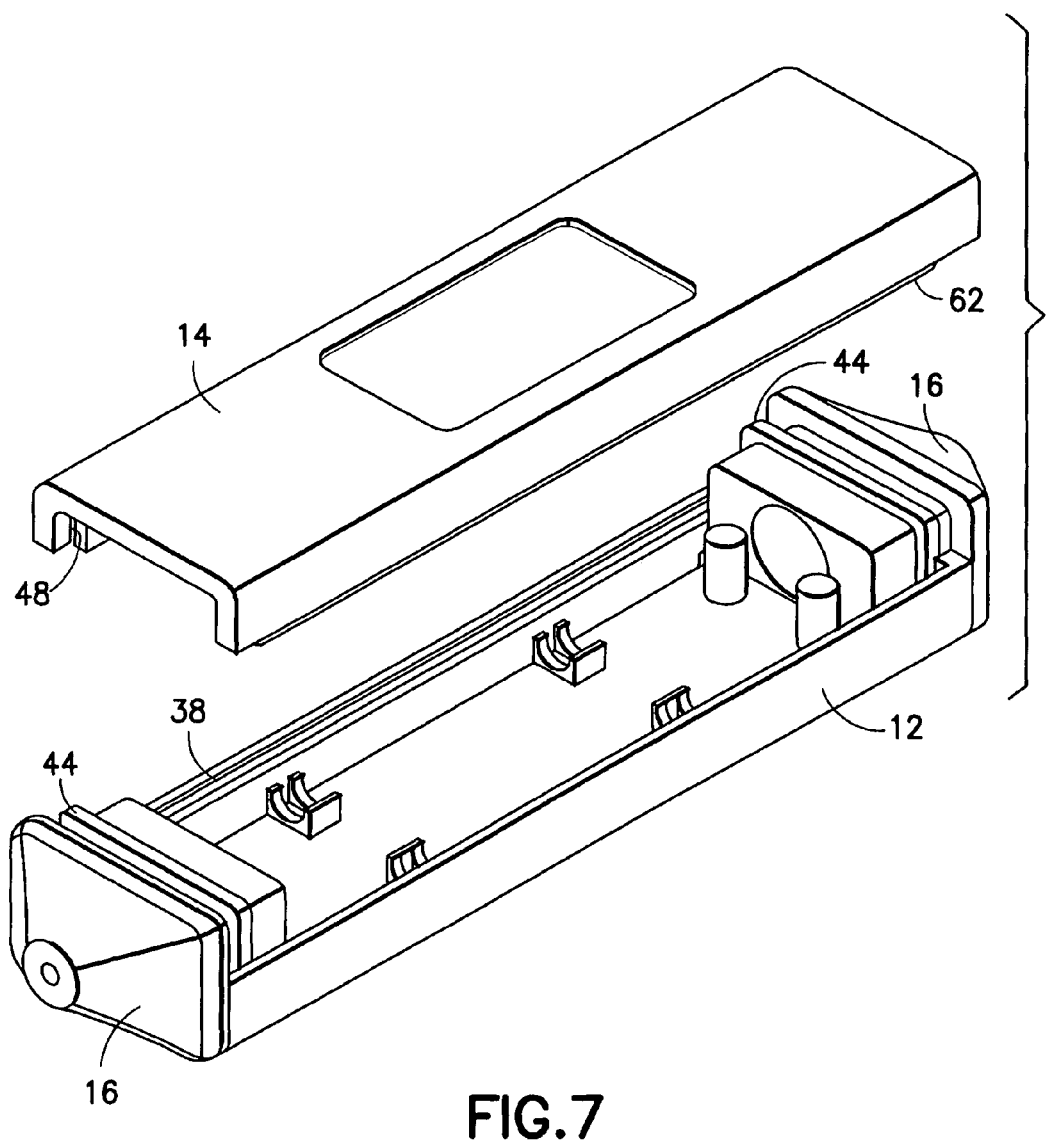
FIG. 7 is a partially exploded perspective view of the optical fiber coupler enclosure shown in FIG. 1.

The end caps 16 are installed to the base 12 as the first step by directly installing the end caps 16 from the top to the base 12 as shown in FIG. 7. The mechanism of installation (or engagement) is a tongue-and-groove design. There is a slight interference (or press-fit) between the two components 10, 14 and the lid 14 and the end caps 16 after the end cap 16 fully inserted, in order to achieve stable and rigid mounting while installing the lid 14 to the base 12 and the end caps 16 as a final stage.

Figure 8:
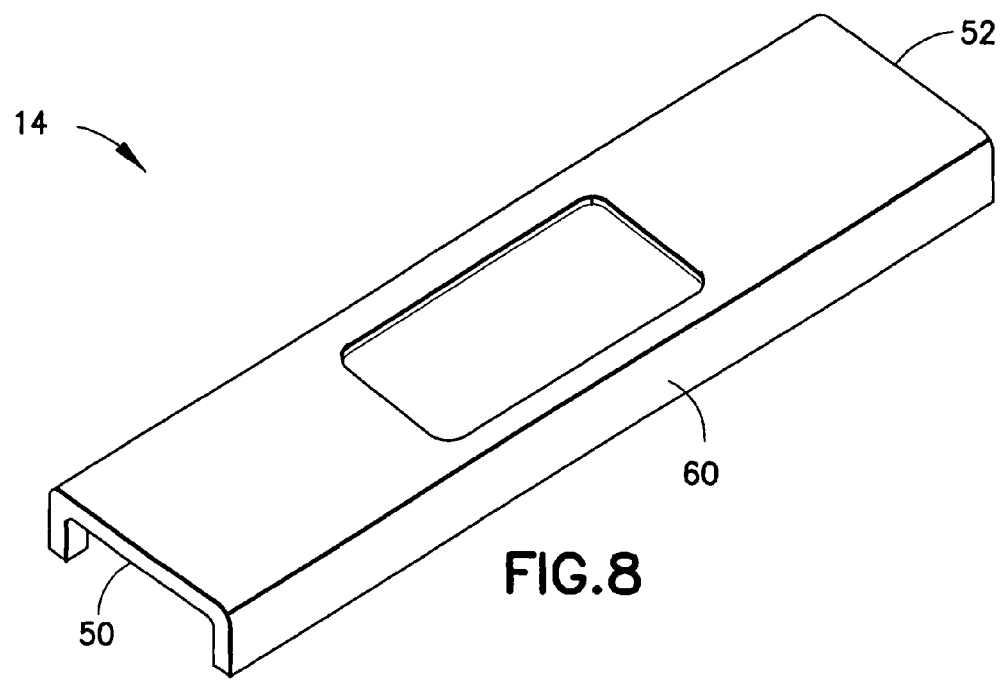
FIG. 8 is a top perspective view of a lid of the optical fiber coupler enclosure shown in FIG. 1.
Figure 9:
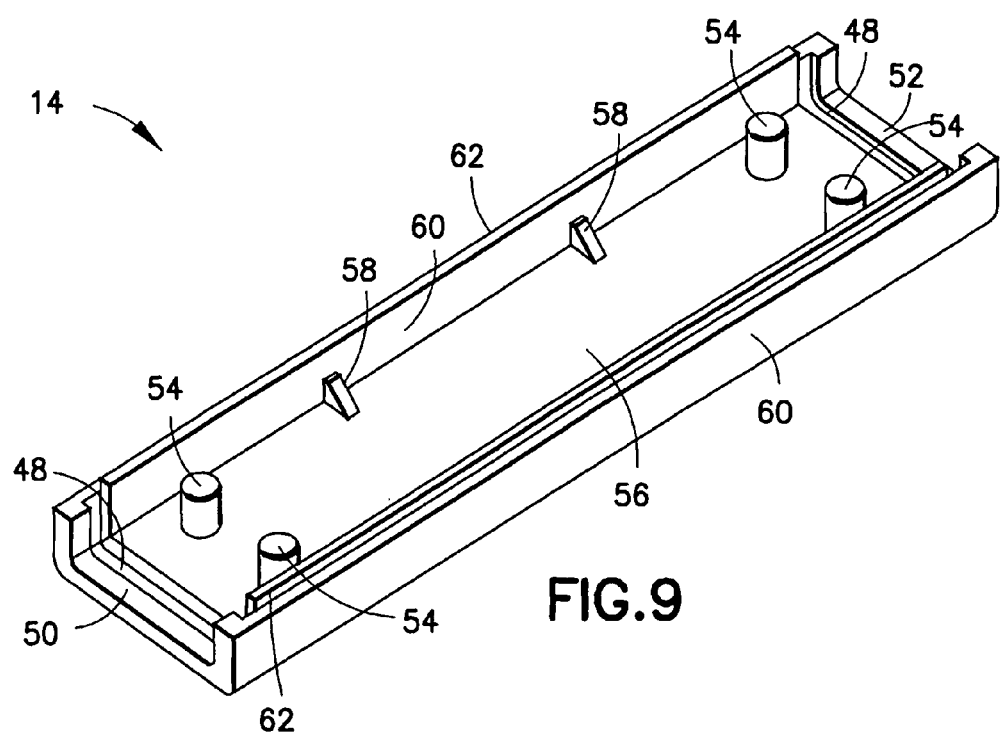
FIG. 9 is a bottom perspective view of the lid of the optical fiber coupler enclosure shown in FIG. 1.

The enclosure lid (or lid member) 14, best illustrated in FIGS. 8 and 9, is the last component to be engaged with the assembly. The lid 14 also has four pegs 54 with identical mating locations to the pegs 36 of the base 12. The four pegs 54 extend from a side 56 of the lid 14. There are four triangular wall supports 58, such as 2.50 millimeters tall for example. These supports 58 will increase the wall strength due to stress acting perpendicularly to the vertical walls (or lid side walls) 60. The lid 14 is connected to the end caps 16 in a similar fashion as described above for the base 12. When the rim 44 of the end caps 16 is engaged with the grooves 48 of the lid 14, the pegs 36 on base 12 are aligned with the pegs 54 on the lid 14. The aligned pegs 36, 54 are appropriately located to maintain the desired optical fiber bend radius. The lid 14 further comprises an extending rim portion 62 extending along the lid side walls 60. The rim portion 62 fits within the groove portion 38 of the base 12. The engagement between the rim portion 62 and the groove portion 38 may be provided by a high performance epoxy resin, an interference or press fit, or any other suitable fastening method.

It should be understood that although the figures illustrate the base 12 as having a groove portion 38 along the side walls 22 and the lid 14 as having a rim portion 62 along the side walls 60, an alternative embodiment may provide a base 12 comprising a rim portion and a lid comprising a groove portion. Additionally, the rim portions 62 and the end cap rims 44 can have a wedge shape and/or the groove portions 38, 46, 48 can have wedge shapes. Furthermore, any other suitable shapes for providing a press fit or interference fit are envisioned.

The disclosed base 12, lid 14, and end caps 16 are preferably formed by an injection molding method. When cost and weight (as opposed to component/material strength) are the primary design application concerns, injection molding provides a preferable method of fabrication. The preferred material for the disclosed enclosure 10 is Polyphenylene Sulfide Resin with R4 series. This flame retardant polymer resin compound may include about 40% glass fiber filler material. Polyphenylene Sulfide Resin is superior in mechanical strength, as well as environmental performance when compared to other suitable materials other than metal and metal alloys. Additionally, after formation Polyphenylene Sulfide Resin provides a material surface having slight roughness which creates an excellent surface bonding for adhesive or epoxy application.

When mechanical strength, chemical resistance, and electrical properties (as opposed to cost and weight) are primary design application concerns, a metal alloy, such as aluminum for example, may be used to fabricate the enclosure 10. Forming the enclosure 10 from metal or metal alloys may increase the cost and weight of the enclosure 10. Additionally, certain features, including the sectional thickness, on the present design may not be able to be produced under conventional machining methods and may lead to enclosure design modifications. Nevertheless, the material selection for the present design is dependent on the application and requirements.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. An optical fiber coupler enclosure comprising:
   a lid member comprising two lid side walls, a first lid open end, and a second lid open end;
   a base member opposite the lid member wherein the base member comprises two base side walls, a first base open end, and a second base open end, wherein a portion of at least one of the two base side walls is adapted to engage with a portion of the lid member, wherein the base member comprises at least one mounting channel proximate to each of the base side walls, wherein the mounting channels extend from a bottom side of the base member, wherein the mounting channels are configured to fixedly dispose at least two fiber optic couplers adjacent to one another, wherein the first lid open end and the first base open end are configured to be proximate first ends of the at least two fiber optic couplers, wherein the second lid open end and the second base open end are configured to be proximate second ends of the at least two fiber optic couplers, wherein each of the mounting channels comprises a general concave shape configured to receive one of the at least two fiber optic couplers, wherein the base member further comprises an elevated wall and first pegs, wherein the elevated wall extends between the base side walls, wherein one of the first pegs is proximate one of the base side walls, wherein another one of the first pegs is proximate the other of the base side walls, and wherein the elevated wall is between the first base open end and the mounting channels; and
   a first end cap disposed between the first lid open end and the first base open end.

2. The optical fiber coupler enclosure of claim 1 wherein the lid member comprises at least one second peg proximate to each of the lid side walls, wherein the second pegs are aligned with the first pegs, wherein the second pegs and the first pegs are configured to maintain an optical fiber bend radius, and wherein the mounting channels are configured to fixedly dispose the at least two fiber optic couplers parallel to each other.

3. The optical fiber coupler enclosure of claim 1 wherein the lid member is engaged with the base member in an interference fit.

4. The optical fiber coupler enclosure of claim 1 wherein the first base open end comprises a first groove portion, wherein the first lid open end comprises a first groove portion, wherein the first end cap comprises a first rim portion, wherein the first rim portion is disposed within the base member first groove portion and the lid member first groove portion, and wherein the first end cap is engaged with the lid member and the base member in an interference fit.

5. The optical fiber coupler enclosure of claim 1 further comprising a second end cap disposed between the second lid open end and the second base open end.

6. The optical fiber coupler enclosure of claim 5 wherein the second end cap is engaged with the lid member and the base member in an interference fit.

7. An optical fiber coupler enclosure comprising:
   a base member comprising a first side, a mounting channel, and two base side walls, wherein the mounting channel extends from the first side, wherein the base member comprises at least one first peg proximate each of the base side walls, wherein the first pegs extend from the first side, wherein the base member further comprises a curved and elevated wall extending from the first side, and wherein the curved and elevated wall is between the first pegs and an open end of the base member;

a lid member connected to the base member, wherein the lid member comprises a second side and two lid side walls, wherein the lid member comprises at least one second peg proximate each of the lid side walls, wherein the second pegs extend from the second side, wherein the second pegs are aligned with the first pegs, and wherein the second pegs and the first pegs are configured to maintain an optical fiber bend radius; and a first end cap at the open end of the base member.

8. The optical fiber coupler enclosure of claim 7 wherein the curved and elevated wall is configured to maintain the optical fiber bend radius.

9. The optical fiber coupler enclosure of claim 7 wherein the base member further comprises at least one mounting channel proximate to each of the base side walls, wherein the mounting channels are configured to fixedly dispose at least two fiber optic couplers adjacent to one another, and wherein the first end cap is disposed between the lid member and the base member.

10. The optical fiber coupler enclosure of claim 8 wherein the base is configured to allow at least one fiber from at least one of the fiber optic couplers to be disposed between one of the second pegs and the curved and elevated wall.

11. The optical fiber coupler enclosure of claim 8 wherein the curved and elevated wall is between the two base side walls and proximate the open end of the base member.

12. The optical fiber coupler enclosure of claim 7 wherein the end cap is disposed between the open end of the base member and an open end of the lid member, wherein the end cap comprises a first rim portion, wherein the open end of the base member comprises a first groove portion, wherein the open end of the lid member comprises a first groove portion, and wherein the first rim portion is disposed within the base member first groove portion and the lid member first groove portion.

13. An optical fiber coupler enclosure comprising:

a base member comprising a mounting channel, a peg, two base side walls, and a first open end, wherein the mounting channel is between the two base side walls, wherein the peg is between the mounting channel and the first open end, and wherein the base member first open end comprises a first groove portion;

a lid member opposite the base member, wherein the lid member comprises two lid side walls and a first open end, wherein the lid member first open end comprises a first groove portion, and wherein the base member and the lid member are configured to hold a first optical fiber coupler therebetween; and at least one end cap disposed between the base member and the lid member, wherein the end cap comprises a first rim portion, wherein the at least one end cap comprises a one-piece member, and wherein the first rim portion is engaged with the base member first groove portion and the lid member first groove portion.

14. The optical fiber coupler enclosure of claim 13 wherein the at least one end cap is engaged with the base member and the lid member in an interference fit.

15. The optical fiber coupler enclosure of claim 13 wherein the base member further comprises a second groove portion along the base side walls, wherein the lid member comprises a second rim portion along the lid side walls, and wherein the second rim portions are disposed within the second groove portions.

16. The optical fiber coupler enclosure of claim 13 wherein the at least one end cap further comprises an opening configured to receive a fiber cable bundling.

17. The optical fiber coupler enclosure of claim 16 wherein the opening is configured to be bonded with the fiber cable bundling.

18. The optical fiber coupler enclosure of claim 16 wherein the opening has a conical shape.

19. The optical fiber coupler enclosure of claim 13 wherein the base member further comprises at least one mounting channel proximate to each of the base side walls, and wherein the mounting channels are configured to fixedly dispose the first fiber optic coupler adjacent and parallel to a second fiber optic coupler.

20. The optical fiber coupler enclosure of claim 13 wherein the base member further comprises at least one first peg proximate each of the base side walls, wherein the lid member comprises at least one second peg proximate each of the lid side walls, wherein the second pegs are aligned with the first pegs, and wherein the second pegs and the first pegs are configured to maintain an optical fiber bend radius.

21. The optical fiber coupler enclosure of claim 1 further comprising a second end cap disposed between the lid member second open end and the base member second open end, wherein the first end cap is configured to be proximate the first ends of the at least two fiber optic couplers, and wherein the second end cap is configured to be proximate the second ends of the at least two fiber optic couplers.

22. The optical fiber coupler enclosure of claim 1 wherein each of the mounting channels further comprises a cavity at a center portion of the general concave shape.

23. An optical fiber coupler enclosure comprising:

a base member comprising a first side, two base side walls, and a first open end, wherein the base member comprises at least one first peg proximate each of the base side walls, wherein the first pegs extend from the first side, wherein the base member comprises at least one mounting channel proximate to each of the base side walls, wherein the mounting channels extend from the first side, wherein the mounting channels are configured to fixedly dispose at least two fiber optic couplers adjacent to one another, and wherein the base member first open end comprises a first groove portion;

a lid member opposite the base member, wherein the lid member comprises a second side, two lid side walls, and a first open end, wherein the lid member comprises at least one second peg proximate each of the lid side walls, wherein the second pegs extend from the second side, wherein the second pegs are aligned with the first pegs, wherein the second pegs and the first pegs are configured to maintain an optical fiber bend radius, and wherein the lid member first open end comprises a first groove portion; and a first end cap disposed between the base member and the lid member, wherein the first end cap comprises a first rim portion integrally formed with the first end cap, wherein the first rim portion extends into the base member first groove portion, and wherein the first rim portion extends into the lid member first groove portion.

* * * * *